C. S. SAPP.
VALVE RELEASERS.
APPLICATION FILED JAN. 13, 1914.
1,108,476. Patented Aug. 25, 1914.
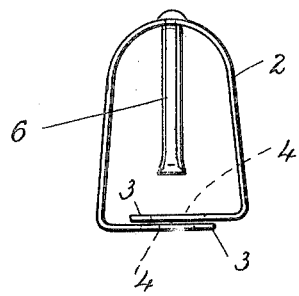
FIG_1_
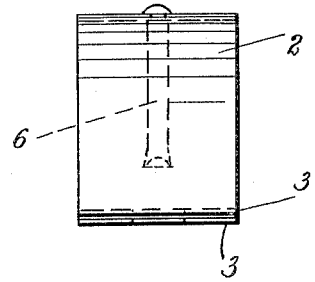
FIG_2_
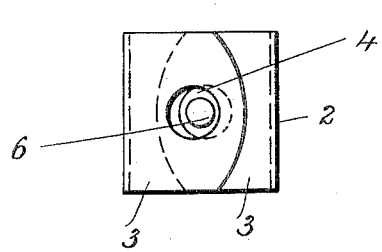
FIG_3_
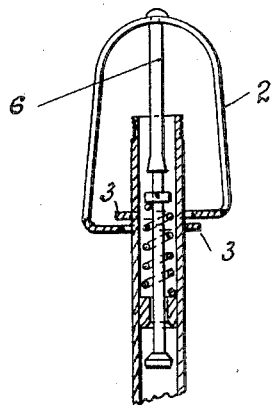
FIG_4_
Witnesses
Walter Allen
Grattan Purcell
Inventor
Charles S. Sapp
By Herbert W. Jenner
Attorney

UNITED STATES PATENT OFFICE.

CHARLES S. SAPP, OF MOUNT VERNON, OHIO.

VALVE-RELEASER.

1,108,476.  Specification of Letters Patent.  Patented Aug. 25, 1914.

Application filed January 13, 1914. Serial No. 811,859.

*To all whom it may concern:*

Be it known that I, CHARLES S. SAPP, a citizen of the United States, residing at Mount Vernon, in the county of Knox and State of Ohio, have invented certain new and useful Improvements in Valve-Releasers; and I do hereby declare the following to be a full, clear, and exact description of the invention, such as will enable others skilled in the art to which it appertains to make and use the same.

This invention relates to devices for holding open the air valves of pneumatic tires used in vehicle road wheels; and it consists of a spring clip provided with a push pin as hereinafter fully described and claimed.

In the drawings, Figure 1 is a side view of a valve releaser constructed according to this invention. Fig. 2 is a side view of the releaser turned around one-quarter from the position shown in Fig. 1. Fig. 3 is a plan view of the releaser. Fig. 4 is a side view of the releaser partly in section and a valve tube in section, showing the releaser in operation.

The releaser is provided with an arch-shaped clip 2 of spring metal having inwardly projecting flanges 3 at its base which overlap each other. Each flange has a hole 4, and the two holes are normally arranged a little out of line with each other, but can be placed in line by pinching the clip between the thumb and first finger of the hand. A push pin 6 is secured to the top of the clip and projects downwardly toward the holes.

The device is intended to be carried in the pocket, and when a pneumatic tire is to be deflated the clip is pinched to place the holes in line, and the holes are slipped over the valve tube of the tire. The valve in the valve tube is pushed open by the push pin, and is held open as long as desired by the spring clip which engages with the tube so that it does not slip. The clip is removed from the tube by pinching it so that it can be slid by hand off the tube.

The spring clip can be made of various shapes and sizes in carrying out this invention, and is not restricted to the shape shown in the drawings.

The point of the push pin is countersunk or roughened to prevent it from slipping.

What I claim is:

1. A valve releaser for a pneumatic tube, comprising a spring clip provided with perforated overlapping flanges for engaging with the valve tube, and having a pin for pushing open the valve.

2. A valve releaser for a pneumatic tube, comprising an arch-shaped spring clip having inwardly projecting overlapping flanges at its bottom edges, said flanges being provided with holes which are normally out of line with each other and which can be slipped over the valve tube when placed in line, and a pin, for pushing open the valve, projecting from the top of the clip toward the said holes.

In testimony whereof I have affixed my signature in the presence of two witnesses.

CHARLES S. SAPP.

Witnesses:
 W. S. SAPP,
 J. E. WARD.